US011922660B2

(12) United States Patent
Foucault et al.

(10) Patent No.: US 11,922,660 B2
(45) Date of Patent: Mar. 5, 2024

(54) METHOD FOR DETERMINING THE POSITIONING OF A FOLLOWING AIRCRAFT WITH RESPECT TO A LEADING AIRCRAFT FLYING IN FRONT OF THE FOLLOWING AIRCRAFT

(71) Applicants: Airbus (S.A.S.), Blagnac (FR); Airbus Operations (S.A.S.), Toulouse (FR)

(72) Inventors: Philippe Foucault, Blagnac (FR); Maxime Lefort, Toulouse (FR); Quentin Demoulin, Toulouse (FR)

(73) Assignees: Airbus (S.A.S.), Blagnac (FR); Airbus Operations (S.A.S.), Toulouse (FR)

( * ) Notice: Subject to any disclaimer, the term of this patent is extended or adjusted under 35 U.S.C. 154(b) by 471 days.

(21) Appl. No.: 17/328,441

(22) Filed: May 24, 2021

(65) Prior Publication Data

US 2021/0374996 A1 Dec. 2, 2021

(30) Foreign Application Priority Data

May 26, 2020 (FR) ...................................... 2005541

(51) Int. Cl.
*G06T 7/73* (2017.01)
*B64D 47/08* (2006.01)
(Continued)

(52) U.S. Cl.
CPC ................... *G06T 7/75* (2017.01); *G06T 7/12* (2017.01); *G06T 7/149* (2017.01); *G06T 17/00* (2013.01);
(Continued)

(58) Field of Classification Search
CPC .. G06T 7/75; G06T 7/12; G06T 7/149; G06T 17/00; G06T 2207/10028;
(Continued)

(56) References Cited

U.S. PATENT DOCUMENTS

| 6,889,941 B1* | 5/2005 | McElreath ............. B64D 39/00 244/175 |
| 2015/0293225 A1* | 10/2015 | Riley ...................... G01S 17/42 356/4.01 |

FOREIGN PATENT DOCUMENTS

| EP | 2338793 A1 * | 6/2011 | ........... B64C 39/024 |
| EP | 2338793 A1 | 6/2011 | |

(Continued)

OTHER PUBLICATIONS

French Search Report for Application No. 2005541 dated Jan. 18, 2021.

*Primary Examiner* — Matthew C Bella
*Assistant Examiner* — Andrew B. Jones
(74) *Attorney, Agent, or Firm* — KDW Firm PLLC (57) ABSTRACT

The method includes a step of acquisition of an image of the leading aircraft, a step of extraction of the outline, an adjustment step including implementing an outline registration algorithm, to determine an optimized profile from a comparison of the outline of the leading aircraft with a profile of the leading aircraft determined from a three-dimensional model of the leading aircraft and from an initial position of the following aircraft with respect to the leading aircraft, and a step of determination of the positioning according to six degrees of freedom of the following aircraft with respect to the leading aircraft, from the optimized profile and from the three-dimensional model of the leading aircraft. The method thus makes it possible to rapidly and accurately determine the positioning of the following aircraft with respect to the leading aircraft, this positioning being used to implement a formation flight.

7 Claims, 7 Drawing Sheets

(51) Int. Cl.
  *G06T 7/12*  (2017.01)
  *G06T 7/149*  (2017.01)
  *G06T 17/00*  (2006.01)
  *G06V 20/64*  (2022.01)

(52) U.S. Cl.
  CPC .............. *G06V 20/64* (2022.01); *B64D 47/08* (2013.01); *G06T 2207/10028* (2013.01); *G06T 2207/10032* (2013.01); *G06T 2207/30241* (2013.01)

(58) Field of Classification Search
  CPC . G06T 2207/10032; G06T 2207/30241; G06T 2200/08; G06V 20/64; B64D 47/08; G05D 1/104; G01C 11/04
  See application file for complete search history.

(56) References Cited

FOREIGN PATENT DOCUMENTS

| EP | 2442201 A2 * | 4/2012 | .............. G05D 1/00 |
| EP | 2442201 A2 | 4/2012 | |

\* cited by examiner

METHOD FOR DETERMINING THE POSITIONING OF A FOLLOWING AIRCRAFT WITH RESPECT TO A LEADING AIRCRAFT FLYING IN FRONT OF THE FOLLOWING AIRCRAFT

CROSS-REFERENCE TO RELATED APPLICATION

This application claims the benefit of and priority to French patent application FR 2005541 filed on May 26, 2020, the entire disclosure of which is incorporated by reference herein.

TECHNICAL FIELD

The disclosure herein relates to a method for determining the positioning of a following aircraft with respect to a leading aircraft, the following aircraft flying in the wake of the leading aircraft, in order to perform a formation flight.

BACKGROUND

In the field of aeronautics, "formation flight" is understood to mean the flight of a formation of at least two aircraft comprising a followed aircraft, called leading aircraft, and at least one following aircraft. In such a formation, the following aircraft is, preferably, servocontrolled so as to repeat the flight instructions of the leading aircraft, in particular via autonomous piloting.

Formation flights, in particular of commercial airplanes, offer the advantage of instantaneously reducing the fuel consumption of the following aircraft by reducing the drag thereof. However, the zone in the space relative to the positioning of the leading aircraft, which offers such interest for the following aircraft, is restricted. It is therefore necessary for the positioning of the following aircraft to be sufficiently accurate and rapid with respect to the position of the leading aircraft for the reduction of fuel consumption to be significant and therefore for the formation flight to be efficient.

Various methods are known for measuring the relative positions of two aircraft in flight, notably by mutual transmission of geolocation data, in particular of the data obtained from a satellite positioning system of GPS (Global Positioning System) type. These standard methods notably require appropriate transmission means between the aircraft and are not necessarily always very accurate.

The standard methods for measuring the relative positions of two aircraft in flight, in particular to have the following aircraft benefit from an optimal positioning, are not therefore fully satisfactory.

SUMMARY

An object of the disclosure herein is to remedy this drawback. It relates to a method for determining the positioning of a following aircraft with respect to a leading aircraft, the leading aircraft flying in front of the following aircraft. In particular, the following aircraft flies in the wake of the leading aircraft, in order to make a formation flight with the leading aircraft.

According to the disclosure herein, the method is implemented by the following aircraft, and comprises the following steps implemented iteratively:
- a step of acquisition of an image, in which the leading aircraft is visible;
- a step of checking for the presence or the absence of a preceding iteration, and for the value of a parameter, called score, matched with each preceding iteration;
- if an absence of preceding iteration or a preceding iteration matched with a score above a predetermined threshold is detected, an initialization step comprising:
  a substep of detection of the leading aircraft on the image,
  a substep of extraction of the outline of the detected aircraft, and
  a substep of determination of a profile of the leading aircraft from a three-dimensional model of the leading aircraft stored in a database and of an initial position of the following aircraft with respect to the leading aircraft;
- if a preceding iteration matched with a score below a predetermined threshold is detected, a continuation step, following an initialization step of a preceding iteration, and comprising a substep of extraction of the outline of the leading aircraft;
- in all cases, an adjustment step consisting in or comprising implementing an outline registration algorithm, to determine an optimized profile from a comparison of the outline of the leading aircraft with its profile and in calculating a value of the score of the iteration from the deviation between the compared outline and profile;
- if the value of the score is below the predetermined threshold, a step of determination of the positioning of the following aircraft with respect to the leading aircraft, from the optimized profile and from the three-dimensional model of the leading aircraft.

Thus, with the method as described above, a rapid and accurate positioning (according to six degrees of freedom) of the following aircraft with respect to the leading aircraft is obtained. This positioning is used to implement a formation flight, in particular by making it possible to define flight instructions for the (automatic) piloting of the following aircraft.

The adjustment step can comprise:
- in the absence of a preceding iteration, the substeps of comparison of the pixels of the profile (determined during the determination substep of the initialization step) with the pixels of the outline of the leading aircraft and of identification of the control points of the outline of the leading aircraft which correspond, respectively, to control points of the profile so as to obtain pairs of control points;
- in the presence of a preceding iteration, the substeps of determination of a new profile of the leading aircraft from the three-dimensional model of the leading aircraft and as a function of the data from the preceding iteration, of comparison of the pixels of the new profile with the pixels of the outline of the leading aircraft and of identification of the control points of the outline of the leading aircraft which correspond, respectively, to control points of the new profile, so as to obtain pairs of control points;
- in all cases, a substep of calculation of a distance between the control points of each pair of control points and of the value of the score of the iteration corresponding to the sum of the distances determined for the set of pairs.

The substep of identification of the control points of the leading aircraft can be based on measurements of local gradients.

The method can comprise a step of transmission of the determined positioning of the following aircraft with respect to the leading aircraft (in the determination step) to at least one user device.

According to one embodiment, the three-dimensional model of the leading aircraft is determined prior to the flight of the following aircraft, for example from the flight or registration number of the leading aircraft.

According to one embodiment, the three-dimensional model of the leading aircraft is determined during the detection substep (of the initialization step), from an analysis of the aerodynamic characteristics of the leading aircraft, such as the form, the wing span or the number of engines of the leading aircraft.

Advantageously, the three-dimensional model of the leading aircraft can take account of the deformations of the leading aircraft in flight.

Furthermore, advantageously, the detection substep can correspond to the implementation of a detection method based on deep learning methods, implementing convolutional neural networks. In particular, this detection method makes it possible to determine, on the image, at least the coordinates of a frame completely containing the leading aircraft. One advantage in the use of a neural network is that the detection is rapid and of constant complexity.

In a particular embodiment, the step of acquisition of an image consists in or comprises taking a monochrome or color image of the leading aircraft from the following aircraft. Thus, the detection method can analyze at least one of the following types of images: monochrome images or color images.

BRIEF DESCRIPTION OF THE DRAWINGS

The attached figures will give a good understanding of how the disclosure herein can be produced. In these figures, identical references denote similar elements.

DETAILED DESCRIPTION

Figure 1:
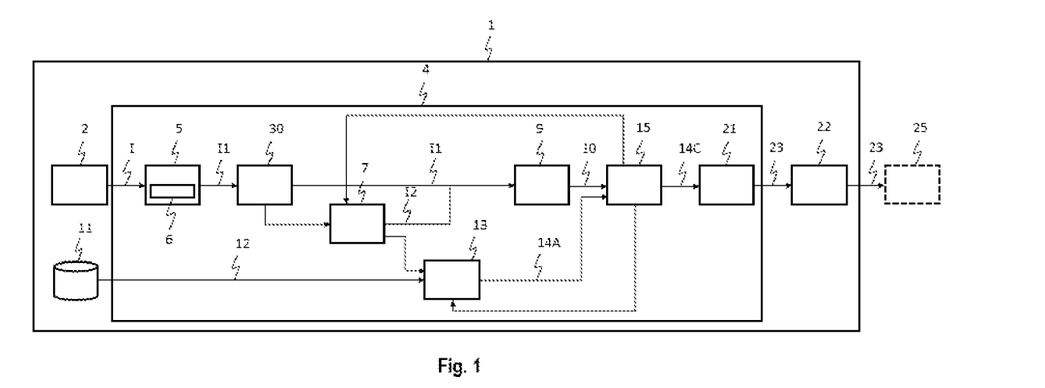
FIG. 1 is a block diagram of an embodiment of a system for determining the positioning of a following aircraft with respect to a leading aircraft, the following aircraft flying in the wake of the leading aircraft.
Figure 5:
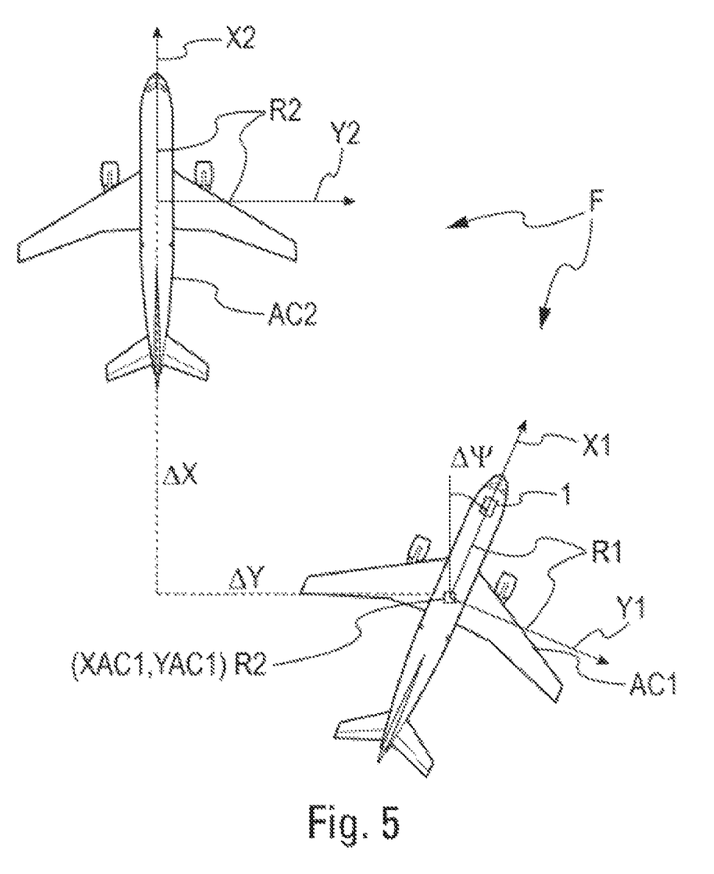
FIG. 5 is a schematic top view of an example of a formation in flight comprising a leading aircraft and a following aircraft.

The system 1, used to illustrate the disclosure herein and represented schematically in FIG. 1, is a system for determining the positioning of a following aircraft AC1 with respect to a leading aircraft AC2, the leading aircraft AC2 flying in front of the following aircraft AC1, the leading aircraft AC2 and the following aircraft AC1 being intended to make a formation flight as represented in FIG. 5.

A formation flight is understood to mean a formation F composed of at least one following aircraft AC1 and of at least one leading aircraft AC2, the following aircraft AC1 following (in flight) the leading aircraft AC2. Such a formation F, represented schematically in FIG. 5, which is generally implemented during a cruising flight, notably allows the following aircraft AC1 to benefit from a reduced drag and thus make fuel savings. However, the reduction in fuel consumption for the following aircraft AC1 is significant only in the case where the following aircraft AC1 flies behind the leading aircraft AC2 within a given range of positions.

The positioning of the following aircraft AC1 with respect to the leading aircraft AC2 must therefore be rapid and accurate. Such a formation flight, notably of the following aircraft AC1, can be performed via autonomous piloting, or else manual piloting, for example using a flight director, or using external visual references such as a view of the leading aircraft or of the condensation trails of the leading aircraft.

Figure 4:
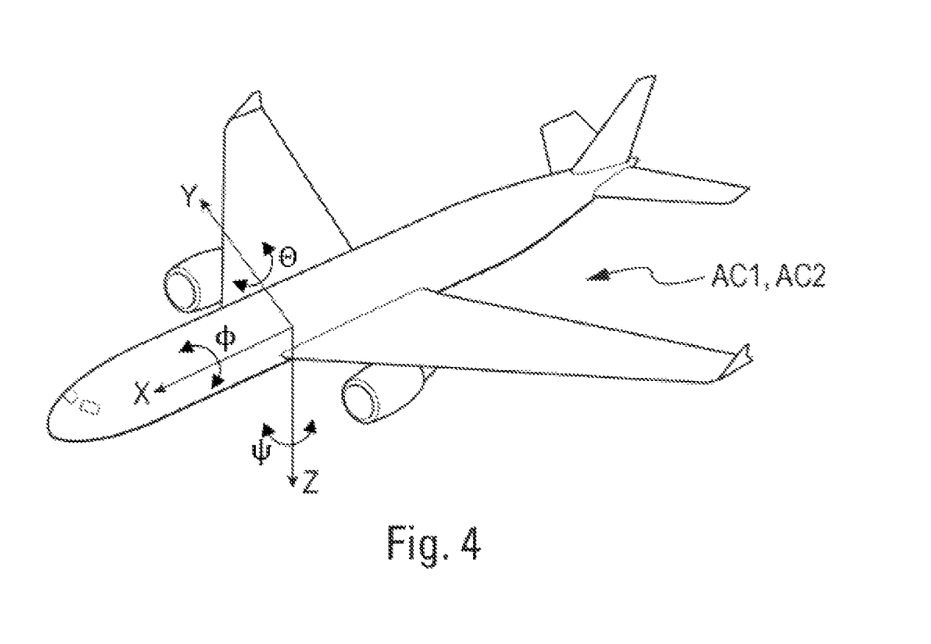
FIG. 4 is a perspective view of an aircraft provided with a reference frame.

In a preferred embodiment (represented in FIG. 4), the position of an object with respect to any one of the aircraft AC1, AC2 is defined by the spatial coordinates of the object, expressed in a cartesian reference frame associated with the corresponding aircraft AC1, AC2. Each aircraft AC1, AC2 is provided with a three-dimensional cartesian reference frame whose origin is a particular known point of the aircraft AC1, AC2. The three dimensions are defined by three orthogonal axes denoted X, Y and Z. Furthermore, the origin of the reference frame of an aircraft AC1, AC2 can be its mean center of gravity, or a point of the front part of the fuselage of the aircraft (i.e. the nose of the aircraft).

So, as illustrated in FIG. 5, the following aircraft AC1 is provided with a three-dimensional cartesian reference frame R1, defined by the axes (X1, Y1, Z1), and the leading aircraft AC2 is provided with a three-dimensional cartesian reference frame R2, defined by the axes (X2, Y2, Z2). The position of a point in a reference frame, for example in the reference frame R1, is given by its coordinates according to the axes (X1, Y1, Z1). More particularly, in the present case, it is the position of the following aircraft AC1 with respect to the leading aircraft AC2 that is the issue. Such a position is given by the coordinates of the origin of the reference frame R1 of the following aircraft AC1 in the reference frame R2 of the leading aircraftAC2, denoted $(XAC1, YAC1, ZAC1)_{R2}$.

In this same preferred embodiment, the orientation of the following aircraft AC1 in the reference frame of the leading aircraft AC2 is defined by three angles according to the three standard rotational movements of the aircraft: roll angle, denoted $\phi$, pitch angle, denoted $\theta$, and yaw angle, denoted $\psi$. The orientation of the following aircraft AC1 with respect to the leading aircraft AC2 can also be defined by the angular deviations (denoted $\Delta\phi$, $\Delta\theta$, $\Delta\psi$) representing the differences between, respectively, the angles denoted φAC1 (roll angle of the following aircraft AC1 in the reference frame of the leading aircraft AC2) and φAC2 (roll angle of the leading aircraft AC2 in the reference frame of the leading aircraft AC2), the angles denoted θAC1 (pitch angle of the following aircraft AC1 in the reference frame of the leading aircraft AC2) and θAC2 (pitch angle of the leading aircraft AC2 in the reference frame of the leading aircraft AC2), and the angles denoted ψAC1 (yaw angle of the following aircraft AC1 in the reference frame of the leading aircraft AC2) and ψAC2 (yaw angle of the leading aircraft AC2 in the reference frame of the leading aircraft AC2).

FIG. 5, schematically illustrating a formation F seen from above, provides a clear illustration of the angular deviation Δψ which corresponds to an angular deviation between the yaw angle of the following aircraft AC1 and the yaw angle of the leading aircraft AC2 in the Earth's reference frame (the yaw angle being the angle between the direction of the airplane and the magnetic or geographic north). The angular deviations Δφ and Δθ are defined by analogy.

The positioning of the following aircraft AC1 with respect to the leading aircraft AC2 is understood to be the position and the orientation of the following aircraft AC1 with respect to the leading aircraft AC2. In fact, the known coordinates $(XAC1, YAC1, ZAC1)_{R2}$ and angular deviations $(\Delta\phi, \Delta\theta, \Delta\psi)_{R2}$ correspond to positioning data 23 which define the positioning of the following aircraft AC1 with respect to the leading aircraft AC2 according to the six degrees of freedom.

The system 1 is mounted on the following aircraft AC1, as illustrated in FIG. 5, and it is configured to determine, in real time, the positioning data 23. The objective of such a determination of positioning is to supply positioning data 23 to a user device 25 represented schematically by dotted lines in FIG. 1. In a preferred embodiment, the user device 25 determines flight instructions from the positioning data 23, notably for automatic (and autonomous) piloting of the following aircraft AC1 during the formation flight.

The system 1 comprises, as represented in FIG. 1, an acquisition device 2 intended to be mounted on the following aircraft AC1. The acquisition device 2 is configured to acquire images I of the leading aircraft AC2, seen from behind, or partly from the side, from the following aircraft AC1.

Figure 6:
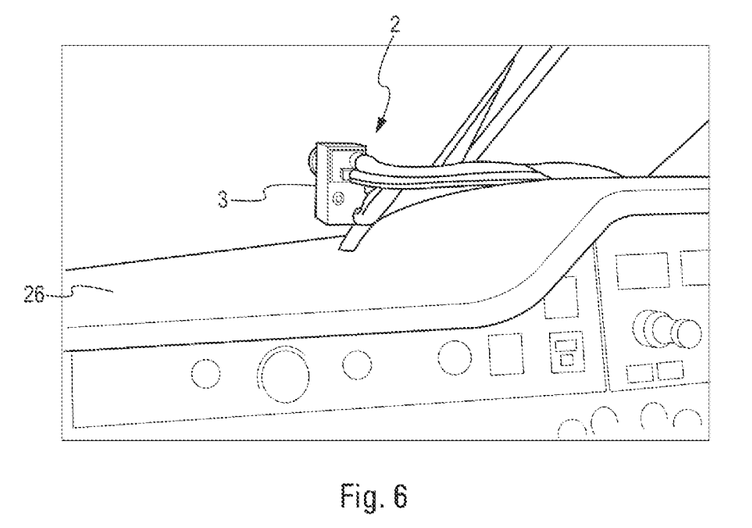
FIG. 6 is a partial perspective view, seen from inside a following aircraft, in particular of an installation of a video camera on the instrument panel of the cockpit of the following aircraft, forming part of a system for determining positioning.

The acquisition device 2 comprises at least one video camera 3 that allows images to be obtained. The resolution of the video camera depends on the zone of movement of the leading aircraft AC2 that is wanted to be covered. For example, the video camera can have a resolution of at least 5 million pixels. The acquisition device can comprise several video cameras allowing images to be obtained. In this case, depending on the zone of movement of the leading aircraft AC2 that is wanted to be covered, each video camera can have a resolution of less than 5 million pixels. In one embodiment, the video camera 3 is fixed in the cockpit 26 of the following aircraft AC1, as represented by way of illustration in FIG. 6. In the context of the disclosure herein, the video camera can be arranged at other points of the following aircraft AC1 where it is able to take images of the environment situated in front of the following aircraft AC1. The video camera 3 is configured so as to be able to take images of the leading aircraft AC2 in video stream form. For example, the video camera 3 can be fixed on the nose cone of the fuselage of the following aircraft AC1.

Furthermore, the system 1 comprises an image processing unit 4 (FIG. 1) which is configured to process, in real time, the images I acquired by the acquisition device 2 according to image processing operations described hereinbelow. According to the disclosure herein, "in real time" means that the latency time for the processing of an image is less than a limit time which allows correct performance of the laws of automation, implemented by computer, which servocontrol the position of the aircraft.

Figure 7:
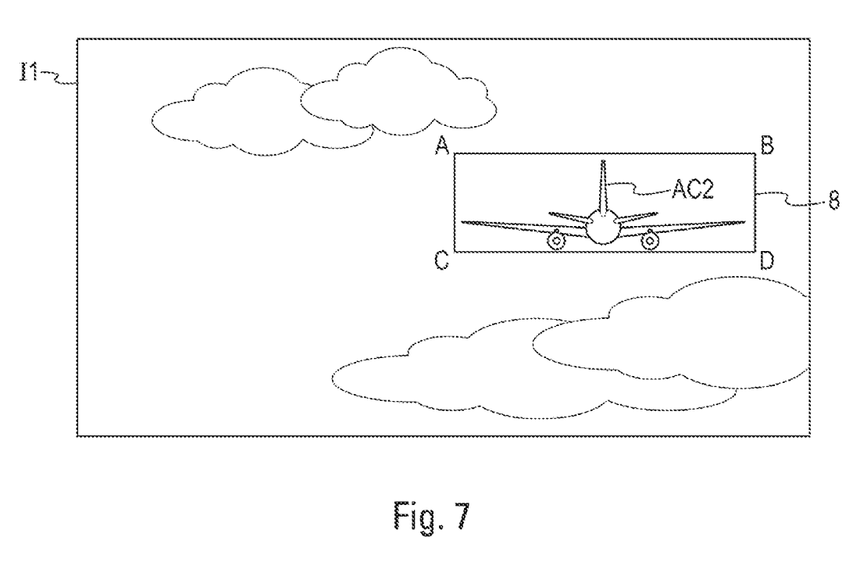
FIG. 7 is a schematic view of an image showing a leading aircraft and provided with a frame entirely containing the leading aircraft, this view making it possible to illustrate a method for detecting the leading aircraft in the image.

More specifically, the image processing unit 4 comprises a reception unit 5 capable of receiving the images I acquired by the acquisition device 2. The reception unit 5 comprises, notably, a memory 6 for storing the images I. The memory 6 is configured to store the images I and to iteratively make available each image to other elements of the image processing unit 4. Each image I, once made available to elements of the image processing unit 4, is considered to be undergoing processing, and becomes a current image I1 (FIG. 7).

In one embodiment, the memory 6 is a cache memory configured to store the images generated by the acquisition device 2 temporarily. In fact, the images I are stored then transferred to the appropriate elements of the image processing unit 4. The images I therefore remain in memory only for the time it takes to process the preceding current image I1. Furthermore, such a cache memory is configured to transfer data at very high speed, which allows the images I to be processed in real time.

The image processing unit 4 comprises a checking unit 30 configured to check whether the image I received by the reception unit 5 is the first image received or not (i.e. if it is a first iteration or if an iteration has already taken place), and to check whether the value of a parameter, called score, is stored in a memory of the image processing unit 4 (this score being derived from a preceding iteration). Furthermore, the image processing unit 4 comprises a detection unit 7 capable of receiving a current image I1 supplied by the reception unit 5. The detection unit 7 is configured to analyze the current image I1 received and in particular to identify, on the current image I1, the leading aircraft AC2 (FIG. 7). In a particular embodiment, the detection unit 7 is capable of analyzing monochrome images or color images. The detection unit does not receive the current image I1 each time an image is acquired. The detection unit 7 is configured to receive and analyze a current image I1 only upon a first image acquisition and when the value of the score stored in a memory of the image processing unit 4 is above a predetermined threshold.

According to the disclosure herein, and for the rest of the description, a value "below" a threshold is considered to be "strictly less than" the threshold, and a value "above" a threshold is considered to be "greater than or equal" to the threshold.

Upon a first image acquisition on which the leading aircraft AC2 is visible, the detection unit 7 must be used to find the leading aircraft AC2 on the image. Upon subsequent acquisitions, and as long as the value of the score is below the predetermined threshold, there is no need to use the detection unit 7 to find the leading aircraft AC2 on the image, since its position in the image is substantially known (the successive images are acquired with a low time interval, and thus the position of the leading aircraft on two successive images varies only very little). When the value of the score becomes greater than the predetermined threshold, it is considered that the position of the leading aircraft AC2 is too far away from the position that it had on the preceding image, and thus that a new detection of the leading aircraft AC2 by the detection unit 7 is necessary.

Figure 8A:
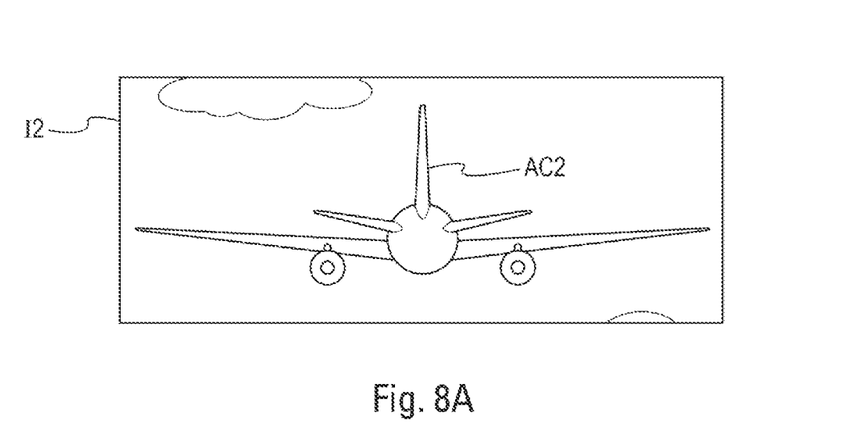
FIG. 8A is a schematic view of a pan-and-scan image showing a leading aircraft.

Furthermore, the detection unit 7 can be configured to isolate the leading aircraft AC2 on the current image I1, and to generate a corresponding pan-and-scan image I2 (FIG. 8A). The pan-and-scan image I2, thus generated, corresponds to a part of the current image I1 completely containing (or encompassing) the leading aircraft AC2. The detection unit 7 can also be configured to isolate the leading aircraft AC2 on the current image I1, and to generate information corresponding to the zone of the current image I1 in which the leading aircraft AC2 is situated.

In one embodiment, the pan-and-scan image I2 is the smallest image, included in the current image I1, completely containing the leading aircraft AC2. The pan-and-scan image I2 is thus smaller than the current image I1, which makes the image processing operations much faster and therefore more efficient in a real-time image stream analysis context.

In a particular embodiment, as illustrated in FIG. 7, the detection unit 7 can be configured to determine the coordinates of four points A, B, C and D on the current image I1. The points A, B, C and D represent the vertices of a rectangle and make it possible to define a rectangular frame 8 completely containing the leading aircraft AC2. The frame 8 delimits the portion of the current image I1 corresponding to the pan-and-scan image I2.

The image processing unit 4 also comprises an extraction unit 9 capable of receiving the pan-and-scan image I2 generated by the detection unit 7 (upon a first image acquisition and when the value of the score stored in a memory of the image processing unit 4 is above a predetermined threshold). The extraction unit 9 is configured to perform image processing operations on the pan-and-scan image I2 so as to obtain coordinates, on the pan-and-scan image I2, of a set of points corresponding to an outline 10 (FIG. 8B) of the leading aircraft AC2. The extraction unit 9 can be configured to receive the information corresponding to the rectangular frame 8 completely containing the leading aircraft AC2 (for example, the coordinates of the points A, B, C and D), instead of receiving the pan-and-scan image I2 directly.

The extraction unit 9 is also configured to directly receive the current image I1 (when the value of the score stored in a memory of the image processing unit 4 is below the predetermined threshold), and to perform image processing operations on the current image I1 so as to obtain coordinates, on the current image I1, of a set of points corresponding to an outline 10 of the leading aircraft AC2.

In a particular embodiment, the image processing operations implemented by the extraction unit 9 consist in or comprise applying filters to the pan-and-scan image I2 to identify the points corresponding to the outline 10 (FIG. 8B), notably standard Gauss and Sobel filters. In fact, such filters make it possible, by calculating local gradients at each point (pixel) of the pan-and-scan image I2, to determine whether the point corresponds to an outline. Examples of pan-and-scan image I2 and of outline 10 obtained by such image processing operations are represented, respectively, in FIGS. 8A and 8B. The image processing operations implemented by the extraction unit 9 can also consist in or comprise applying these filters to the part of the image corresponding to the rectangular frame 8 completely containing the leading aircraft AC2 to identify the points corresponding to the outline 10.

Moreover, the system 1 comprises a database 11 containing a three-dimensional model 12 of the leading aircraft AC2, representing a complete three-dimensional model of the outer boundary of the leading aircraft AC2. In a preferred embodiment, the database 11 contains the three-dimensional models of all the types of aircraft likely to be followed (in formation flight) by the following aircraft AC1.

The three-dimensional model of the leading aircraft AC2 can be determined prior to the flight of the following aircraft AC1. For example, it is possible to communicate the flight number or the registration number of the leading aircraft AC2 to the image processing unit 4.

As a variant, the model of the leading aircraft AC2 can be determined by the detection unit 7, from an analysis of the aerodynamic characteristics of the leading aircraft AC2. For example, the form, the wing span or the number of engines can be determined on the pan-and-scan image I2 or on the zone of the current image I1 corresponding to the rectangular frame 8 entirely containing the leading aircraft AC2.

With this information, the image processing unit 4 determines the model of the aircraft and what three-dimensional model 12 must be taken into account and extracted from the database 11 for the ongoing image processing.

In a particular embodiment not represented, the database 11 forms part of the image processing unit 4.

Furthermore, the processing unit 4 comprises a determination unit 13 configured to determine a profile of the leading aircraft AC2 from the three-dimensional model 12 of the leading aircraft AC2 and from an initial position of the following aircraft AC1 with respect to the leading aircraft AC2. To do this, the determination unit 13 is configured to, from the pan-and-scan image I2, command a display of the three-dimensional model 12 with a positioning such that the profile 14A of the three-dimensional model 12 thus obtained roughly corresponds to the profile of the leading aircraft AC2 on the pan-and-scan image I2. More specifically, the profile 14A of the leading aircraft corresponds to a simulated view of the three-dimensional model of the leading aircraft AC2 from the camera 3 positioned on the following aircraft AC1. The profile 14A corresponds substantially to a view of the leading aircraft AC2, in terms of position and of orientation, on the image I1 or on the pan-and-scan image I2. The profile 14A thus corresponds substantially to the outline 10 of the leading aircraft AC2.

Figure 2:
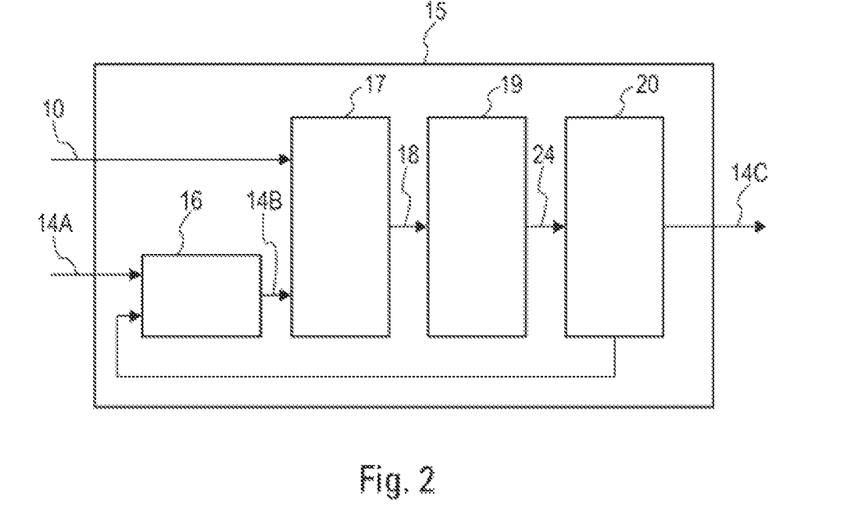
FIG. 2 is a block diagram of an embodiment of an image processing unit of the system for determining the positioning of FIG. 1.

The image processing unit 4 also comprises a registration unit 15 capable of receiving the outline 10 from the extraction unit 9 and the profile 14A from the determination unit 13. The registration unit 15, represented in FIG. 2, is configured to compare the profile 14A with the outline 10 of the leading aircraft AC2, in order to determine the adjustment needed to obtain an optimal match, according to predefined criteria. The registration unit 15 therefore makes it possible to obtain an optimized profile 14C from a comparison of the outline 10 of the leading aircraft AC2 with its profile 14A. The registration unit 15 uses an outline registration algorithm, detailed hereinbelow. The example represented in FIGS. 9A and 9B and described below will give a better understanding of the registration principle presented.

The registration unit 15 comprises the following elements, represented in FIG. 2 and implementing an iterative processing (in real time) as specified below:
  a determination element 16 configured to, in the presence of a preceding iteration, determine a new profile 14B (FIG. 9A) of the leading aircraft AC2, from the three-dimensional model of the leading aircraft AC2 and as a function of the data from the preceding iteration. For the first iteration, the profile 14A is used to initiate the iteration loop;
  a comparison element 17 configured to compare the pixels of the profile 14A or of the new profile 14B (depending on the iteration) and the pixels of the outline 10 and thus obtain a comparison 18;

an identification element 19 configured to identify control points P1A, P2A, P3A and P4A of the outline 10 of the leading aircraft AC2 which correspond, respectively, to control points P1B, P2B, P3B and P4B of the profile 14A or of the new profile 14B (FIG. 9A) (depending on the iteration) so as to obtain pairs of control points 24. "Correspond" is understood to mean the fact that the control points P1A, P2A, P3A and P4A of the outline 10 are situated on the same characteristic points as the control points P1B, P2B, P3B and P4B of the profile 14A or of the new profile 14B. The identification is performed for a predetermined number of control points. The control points, of which some, P1A to P4A, P1B to P4B and P1C to P4C, are highlighted in FIGS. 8A, 9A and 9B, correspond to characteristic points (pixels), such as edges for example, of the outline considered.

For these, one control point is chosen as a starting point and a similar point is sought in a direction orthogonal to the outline (equivalent to the direction of the local gradient) up to a maximum distance, for example 20 pixels. If such a point is not found, it is considered that there is no sufficiently similar control point and this point is excluded; and a computation element 20 configured to calculate the distances between the control points of each pair of control points 24 and to determine whether the profile 14A or the new profile 14B is sufficiently close to the outline 10. The computation element 20 is also configured to calculate a value of the score of the iteration corresponding to the sum of the distances determined for the set of pairs. In other words, the computation element 20 is configured to calculate a value of the score of the iteration from the deviation between the outline 10 and the profile 14A or the new profile 14B. If the value of the score is below the predetermined threshold, the profile 14A or the new profile 14B is considered to correspond to a profile 14C (FIG. 9B), and if the value of the score is above the predetermined threshold, a new iteration of the iterative processing must be performed.

More specifically, the computation element 20:

determines, for each pair of control points, for example for the pair of control points P2A and P2B (FIG. 9A), a so-called individual distance between the control points;

determines a value of the score from the duly determined individual distances for the set of pairs. This score represents a comparison metric which can correspond to the sum of the distances, that is to say to an overall distance.

This score can also be calculated in other ways, for example by a least squares method;

compares this value to a predetermined threshold, and, based on this comparison:

if the value of the score is above the predetermined threshold, that is to say if the profile 14A or the new profile 14B is too far away from the outline 10, a new iteration is implemented using data comprising at least the distances: and if the value of the score is below the predetermined threshold, that is to say if the profile 14A or the new profile 14B is sufficiently close to the outline 10, the profile is considered as optimized profile and it is retained for it to be transmitted, as specified below.

Figure 9A:
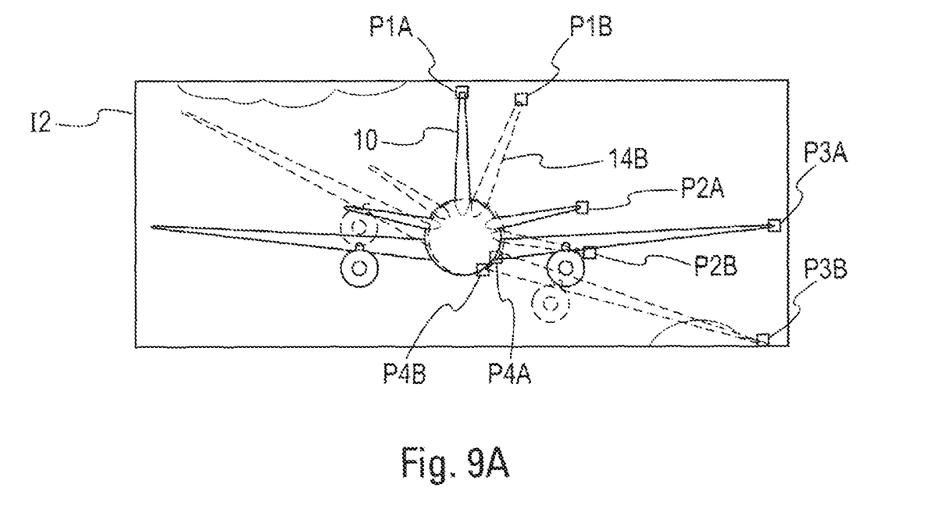
FIG. 9A is a schematic view showing the overlay of an outline of a leading aircraft and of a profile.
Figure 9B:
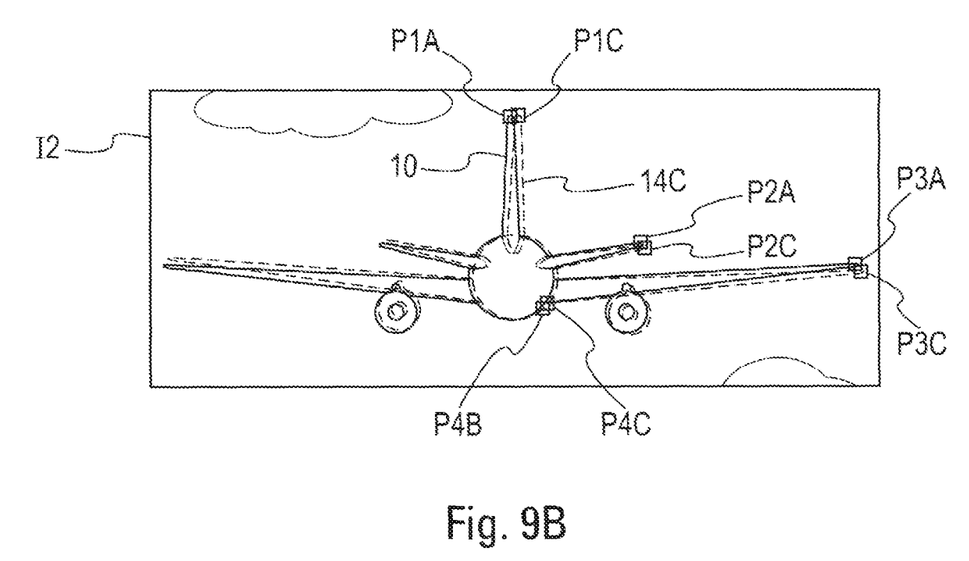
FIG. 9B is a schematic view showing the overlay of the outline of the leading aircraft and of an optimized profile, FIGS. 9A and 9B making it possible to illustrate a method for registering the profile of the leading aircraft.

As illustration:

in the example of FIG. 9A, the value of the score, for example the overall distance (sum of the individual distances between the pairs P1A and P1B, P2A and P2B, P3A and P3B, P4A and P4B) is considered to be too high;

on the other hand, in the example of FIG. 9B, the value of the score is considered to be below the predetermined threshold. There is thus an optimized profile 14C (with control points P1C to P4C) in which the individual distances between the pairs P1A and P1C, P2A and P2C, P3A and P3C, P4A and P4C (FIG. 9B) are sufficiently small.

The registration unit 15 is therefore capable of determining, by successive adjustments (during the implementation of the iterative processing), an optimized profile 14C corresponding to the outline 10, as illustrated in FIG. 9A.

In one embodiment, the image processing unit 4 is configured to command a new detection of the leading aircraft AC2 and the generation of a new profile 14B in the case where no match between the new profile 14B and the outline 10 is obtained. In fact, in the case where the computation element 20 does not manage to converge toward a sufficient match between the new profile 14B and the outline 10, the registration unit 15 is configured to communicate with the detection unit 7 and the determination unit 13. The registration unit 15 then commands the detection unit 7 to reinitialize the detection of the leading aircraft AC2 on the current image I1, generating a new pan-and-scan image I2 or information corresponding to the zone of the current image I1 where the leading aircraft AC2 is situated (for example the coordinates of the points A, B, C and D delimiting the frame entirely containing the leading aircraft AC2). A new estimation of the shot of the leading aircraft AC2 is performed. The registration unit 15 then orders from the determination unit 13 a new determination of profile 14A from the new pan-and-scan image I2 or from the information on the zone of the current image I1 where the leading aircraft AC2 is situated. The registration unit 15 then implements a new iterative processing of the new pan-and-scan image I2 or the current image I1 with the information on the zone of the current image I1 where the leading aircraft AC2 is situated as described above.

Moreover, in a preferred embodiment, the three-dimensional model 12 takes account of the deformations of the leading aircraft AC2. In fact, the three-dimensional model 12 is stored in the database 11 so that the determination unit 13 can generate a profile of the leading aircraft AC2 with the deformations that the leading aircraft AC2 is likely to undergo during the flight. For example, if the leading aircraft AC2 exhibits deformations on the wings, the determination unit 13 is configured to offer to the registration unit 15 a new profile 14B exhibiting deformations on the wings.

Such a three-dimensional model 12 allows the profile determined by the determination unit 13 to be adapted to the real profile of the leading aircraft AC2 in real time and an optimal match to be obtained between the new profile 14B and the outline 10. This optimal match allows a more accurate estimation of the positioning of the following aircraft AC1 with respect to the leading aircraft AC2. Furthermore, the image processing unit 4 comprises a determination unit 21 configured to receive and process the data originating from the registration unit 15. The determination unit 21 is configured to determine, from the optimized profile 14C and from the three-dimensional model 12 of the leading aircraft AC2, the positioning (X1, Y1, Z1; A$\phi$, A$\theta$, A$\psi$)$_{R2}$ of the following aircraft AC1 with respect to the leading aircraft AC2. The positioning data of the following aircraft AC1 with respect to the leading aircraft AC2 are an input in the determination of the optimized profile 14C. Indeed, from the optimized profile 14C and from the three-dimensional model 12 of the leading aircraft AC2, the determination unit 21 is configured to determine the position and the orientation of the acquisition device 2 taking the images of the leading aircraft AC2. Furthermore, since the characteristics of the acquisition device 2 mounted on the following aircraft AC1 are known, notably its position and its orientation with respect to the reference frame of the following aircraft AC1, the positioning data 23 can be accessed by deduction.

The system 1 also comprises a transmission unit 22 configured to transmit the positioning data 23 supplied by the determination unit 21 of the image processing unit 4 to the user device 25. Such a user device 25 is capable of analyzing the positioning data 23 and of using them, notably to establish a flight instruction for the following aircraft AC1 in order to perform the formation flight F. In a preferred embodiment, the following aircraft AC1 is piloted autonomously based on the positioning data 23 to be positioned exactly in the formation, and also from other positioning data. A merging of data can be implemented for the piloting of the following aircraft AC1.

In a particular embodiment, the transmission unit 22 transmits the positioning data 23 to the user device 25 by an ethernet bus using a VCOM communication protocol. Obviously, another communication means can be used to transmit the positioning data 23 to the user device 25.

The system 1, as described above, is able to implement a method P for determining the positioning of the following aircraft AC1 with respect to the leading aircraft AC2 flying in front of the following aircraft AC1. The method P for determining positioning implements, iteratively, the series of successive steps described hereinbelow and illustrated by FIG. 3, in association with the system 1 represented in FIGS. 1 and 2.

Figure 3:
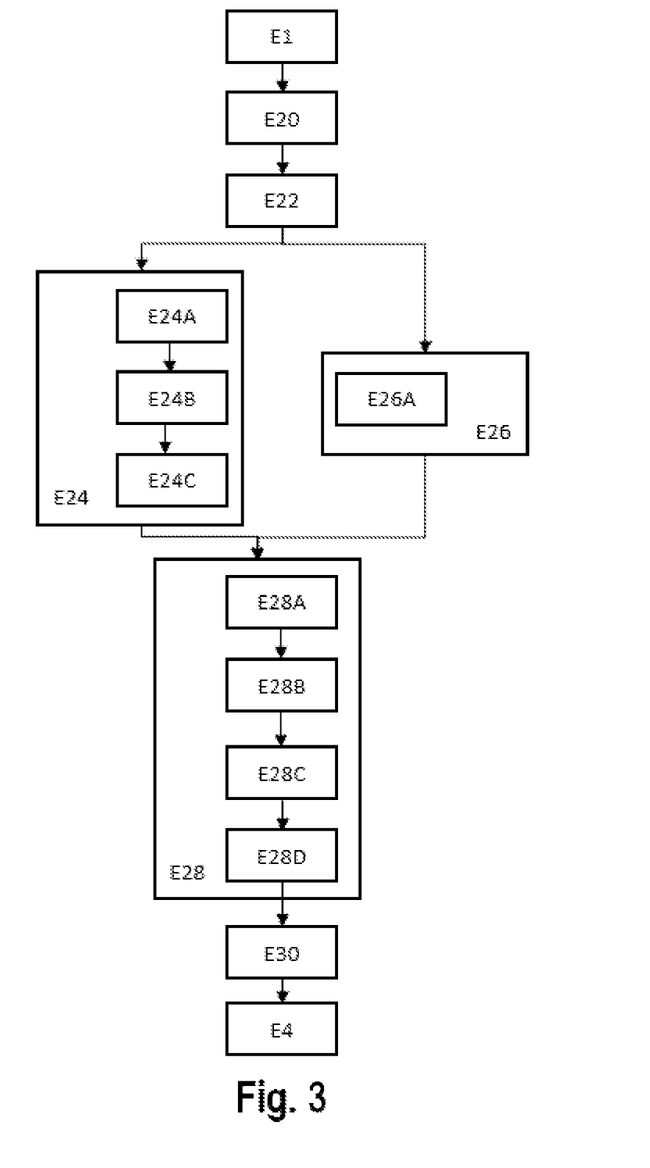
FIG. 3 schematically illustrates the main steps of a preferred embodiment of a method for determining the positioning of a following aircraft with respect to a leading aircraft, the following aircraft flying in the wake of the leading aircraft.

The method P first of all comprises a step of acquisition of an image E1, implemented by the acquisition device 2, which consists in or comprises taking successive images I of the leading aircraft AC2 from the following aircraft AC1, using the acquisition device 2.

The method P then comprises an image processing step E2, implemented by the image processing unit 4, which consists in or comprises processing the images I supplied in the acquisition step E1 to obtain the positioning of the following aircraft AC1 with respect to the leading aircraft AC2.

To this end, the image processing step E2 comprises the series of steps described below.

The image processing step E2 first of all comprises a reception step E20, implemented by the reception unit 5, which consists in or comprises receiving the images I acquired in the acquisition step E1 and in making the images I available one after the other. The image supplied at the current instant is designated current image I1. The reception step E20 also consists in or comprises storing the images I temporarily, for the time it takes to process the current image I1.

The image processing step E2 comprises a step of checking E22 for the presence or the absence of a preceding iteration, and for the value of the score matched to the preceding iteration.

The image processing step E2 also comprises an initialization step E24, which is implemented if an absence of preceding iteration or a preceding iteration matched with a score above a predetermined threshold has been detected during the checking step E22.

The initialization step E24 comprises a detection substep E24A, implemented by the detection unit 7, which consists in or comprises receiving the current image I1 supplied in the reception substep E20 and detecting, on the current image I1, the leading aircraft AC2. In one embodiment, the detection substep E24A uses deep learning methods involving convolutional neural networks in order to detect the leading aircraft AC2 on the current image I1. Such methods require a preliminary parameterization of the neural networks, notably by training in the detection of an aircraft on an image. The training includes, for example, submitting to the neural networks sets of enriched images, that is to say images containing an aircraft on which the aircraft are already identified (by their coordinates on the image or by indexing in particular).

The detection substep E24A can also consist in or comprise generating a new image, called pan-and-scan image I2, from the current image I1. The detection substep E24A can comprise a transmission of information concerning the zone of the current image I1 where the leading aircraft AC2 is situated (for example the coordinates of the points A, B, C and D delimiting the rectangular frame 8 entirely containing the leading aircraft AC2), instead of a transmission of a pan-and-scan image I2. Such a pan-and-scan image I2 corresponds to a part of the current image I1 completely containing (or encompassing) the leading aircraft AC2, as represented in FIG. 7.

In a particular embodiment, the pan-and-scan image I2 is delimited by the smallest rectangular frame completely containing the leading aircraft AC2.

During the detection substep E24A, the three-dimensional model of the leading aircraft AC2 can be determined, from an analysis of the aerodynamic characteristics of the leading aircraft AC2, such as the form of the aircraft, the wing span or the number of engines of the leading aircraft AC2. The three-dimensional model of the leading aircraft AC2 can also be determined prior to the flight of the following aircraft AC1, for example by knowing the flight number of the leading aircraft AC2 or its registration number. The three-dimensional model 12 advantageously takes account of the deformations of the leading aircraft AC2 in flight.

Figure 8B:
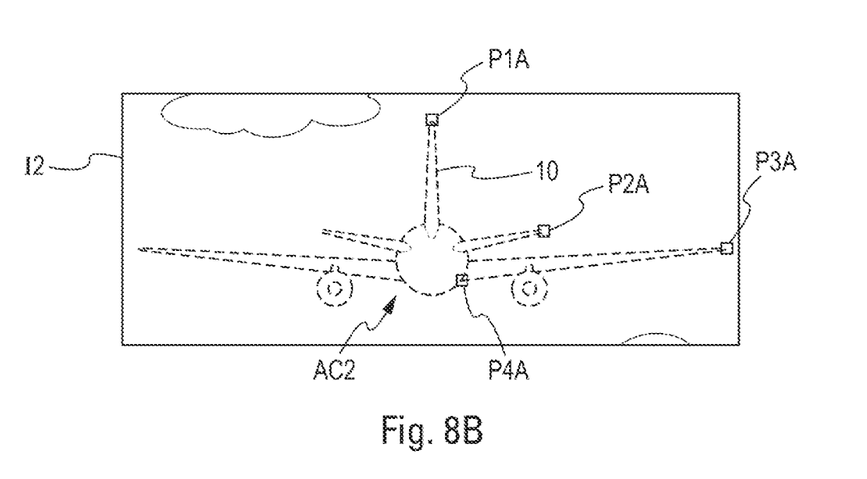
FIG. 8B is a schematic view showing the outline associated with the leading aircraft, FIGS. 8A and 8B making it possible to illustrate a method for extracting the outline of a leading aircraft in an image.

The initialization step E24 further comprises an extraction substep E24B, implemented by the extraction unit 9, which consists in or comprises receiving the pan-and-scan image I2 supplied in the detection substep E24A and in applying image processing operations to the pan-and-scan image I2 to determine a set of points corresponding to an outline 10 of the leading aircraft AC2 as represented in FIG. 8B. The extraction substep E24B can also consist in or comprise receiving the information concerning the zone of the current image I1 where the leading aircraft AC2 is situated (information concerning the rectangular frame 8 delimited by the points A, B, C and D) and in applying image processing operations to this zone of the current image I1 to determine a set of points corresponding to an outline 10 of the leading aircraft AC2.

In a particular embodiment, the image processing implemented in the extraction substep E24B consists in or comprises calculating, for each pixel of the pan-and-scan image I2, the local gradient. The local gradient information makes it possible to determine whether a pixel belongs to an outline. Such calculations are performed by applying filters, notably Gauss and Sobel filters.

The initialization step E24 also comprises a determination substep E24C, implemented by the determination unit 13, consisting in or comprising determining a profile of the leading aircraft AC2 from the three-dimensional model 12 of the leading aircraft AC2, stored in the database 11, and from the initial position of the following aircraft AC1 with respect to the leading aircraft AC2. The profile 14A is a visualization of the three-dimensional model 12 with a positioning roughly corresponding to that of the profile of the leading aircraft AC2 and the pan-and-scan image I2.

The image processing step E2 comprises a continuation step E26 comprising a substep of extraction E26A of the outline 10 of the leading aircraft AC2. This continuation step E26 is implemented if a preceding iteration matched with a score below the predetermined threshold is detected. This continuation step E26 follows an initialization step E24 of a preceding iteration, that is to say that the continuation step E26 is implemented only after the implementation of the initialization step E24 of a preceding iteration. There are various steps between the initialization step E24 of a preceding iteration and the continuation step E26.

In other words, the initialization step E24 of a preceding iteration and the continuation step E26 do not directly follow one another.

The image processing step E2 also comprises an adjustment step E28, implemented by the registration unit 15, which consists in or comprises receiving the outline 10 and the profile 14A, then in comparing them in order to determine the adjustment that has to be applied to obtain an optimal match according to predefined criteria. More specifically, the adjustment step E28 consists in or comprises determining, by an outline registration algorithm, an optimized profile 14C from a comparison of the outline of the leading aircraft with its profile and in calculating a value of the score of the iteration from the deviation between the compared outline and profile.

To this end, the adjustment step E28 implements, in real time and iteratively, the following substeps:
  in the presence of a preceding iteration, a determination substep E28A, implemented by the determination element 16, consisting in or comprising determining a new profile 14B of the leading aircraft AC2 from the three-dimensional model of the leading aircraft and as a function of the data from the preceding iteration. The first iteration uses the profile 14A to initiate the series of operations;
  a comparison substep E28B, implemented by the comparison element 17, consisting in or comprising comparing the pixels of the profile 14A or of the new profile 14B (depending on the iteration) and the pixels of the outline 10;
  an identification substep E28C, implemented by the identification element 19, consisting in or comprising identifying control points of the outline 10 of the leading aircraft AC2 which correspond respectively to control points of the profile 14A or of the new profile 14B, so as to obtain pairs of control points 24. The identification substep E28C can be based on measurements of local gradients; and
  a computation substep E28D, implemented by the computation element 20, consisting in or comprising calculating distances between the control points of each pair of control points 24 and in determining whether the profile 14B is sufficiently close to the outline 10, in which case the profile corresponds to an optimized profile 14C and the series of operations is stopped, or else whether it is necessary to trigger a new iteration. The adjustment step E28 thus consists in or comprises implementing an outline registration algorithm to determine an optimized profile 14C from a comparison of the outline of the leading aircraft with the profile 14A or the new profile 14B (depending on the iteration). It is during this computation substep E28D that the value of the score of the iteration which corresponds to the sum of the distances determined for the set of pairs is calculated.

The processing step E2 comprises, finally, a determination step E30, implemented by the determination unit 21 after the adjustment step 28. The determination step E30 consists in or comprises determining the positioning of the following aircraft AC1 with respect to the leading aircraft AC2 from the optimized profile 14C and from the three-dimensional model 12 of the leading aircraft AC2. In particular, the object of this determination step E30 is to determine, from these data, the information on positioning $(X1, Y1, Z1; A\phi, A\theta, A\psi)_{R2}$ of the following aircraft AC1 with respect to the leading aircraft AC2.

The method P finally comprises a transmission step E4, implemented by the transmission unit 22 after the determination step E30. This transmission step E4 consists in or comprises transmitting the positioning data 23 of the following aircraft AC1 with respect to the leading aircraft AC2 to the user device 25 in order to establish a flight instruction for the following aircraft AC1 and in order to perform the formation flight.

The subject matter disclosed herein can be implemented in or with software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for determining positioning of a following aircraft with respect to a leading aircraft flying in front of the following aircraft, the method being implemented by the following aircraft, and the method comprising steps implemented iteratively of:

a step of acquisition of an image, in which the leading aircraft is visible;

a step of checking for presence or absence of a preceding iteration, and for a value of a parameter, called score, matched with each preceding iteration;

if an absence of preceding iteration or a preceding iteration matched with a score above a predetermined threshold is detected, an initialization step comprising:
- a) a substep of detection of the leading aircraft on the image;
- b) a substep of extraction of an outline of the detected aircraft; and
- c) a substep of determination of a profile of the leading aircraft from a three-dimensional model of the leading aircraft stored in a database and of an initial position of the following aircraft with respect to the leading aircraft;

if a preceding iteration matched with a score below a predetermined threshold is detected, a continuation step, following an initialization step of a preceding iteration, and comprising a substep of extraction of the outline of the leading aircraft;

in all cases, an adjustment step comprising implementing an outline registration algorithm, to determine an optimized profile from a comparison of the outline of the leading aircraft with its profile and in calculating the value of the score of the iteration from deviation between the compared outline and profiles;

if the value of the score is below the predetermined threshold, a step of determination of positioning of the following aircraft with respect to the leading aircraft, from the optimized profile and from the three-dimensional model of the leading aircraft.

2. The method according to claim 1, in which the adjustment step comprises:

in absence of a preceding iteration, the substeps of comparison of pixels of the profile with pixels of the outline of the leading aircraft and of identification of control points of the outline of the leading aircraft which correspond, respectively, to control points of the profile to obtain pairs of control points;

in presence of a preceding iteration, the substeps of determination of a new profile of the leading aircraft from the three-dimensional model of the leading aircraft as a function of data from the preceding iteration, of comparison of the pixels of the new profile with the pixels of the outline of the leading aircraft and of identification of the control points of the outline of the leading aircraft which correspond, respectively, to control points of the new profile, to obtain pairs of control points;

in all cases, a substep of calculation of a distance between the control points of each pair of control points and of the value of the score of the iteration corresponding to a sum of the distances determined for the set of pairs.

3. The method according to claim 2, in which the substep of identification of the control points of the outline of the leading aircraft is based on measurements of local gradients.

4. The method according to claim 1, comprising a step of transmission of the determined positioning of the following aircraft with respect to the leading aircraft to at least one user device.

5. The method according to claim 1, in which the three-dimensional model of the leading aircraft is determined prior to flight of the following aircraft.

6. The method according to claim 1, in which the three-dimensional model of the leading aircraft is determined during the detection substep from an analysis of the aerodynamic characteristics of the leading aircraft.

7. The method according to claim 1, in which the three-dimensional model of the leading aircraft takes account of deformations of the leading aircraft in flight.

* * * * *

UNITED STATES PATENT AND TRADEMARK OFFICE
CERTIFICATE OF CORRECTION

PATENT NO. : 11,922,660 B2
APPLICATION NO. : 17/328441
DATED : March 5, 2024
INVENTOR(S) : Philippe Foucault, Maxime Lefort and Quentin Demoulin Page 1 of 1

It is certified that error appears in the above-identified patent and that said Letters Patent is hereby corrected as shown below:

In the Specification

Column 4, Line 67: "(denoted AΦ, AΘ, AΨ)" should be -- (denoted ΔΦ, ΔΘ, ΔΨ) --.

Column 10, Lines 65 and 66: "(denoted AΦ, AΘ, AΨ)" should be -- (denoted ΔΦ, ΔΘ, ΔΨ) --.

Column 14, Lines 16 and 17: "(denoted AΦ, AΘ, AΨ)" should be -- (denoted ΔΦ, ΔΘ, ΔΨ) --.

Signed and Sealed this
Fifteenth Day of April, 2025

Coke Morgan Stewart
*Acting Director of the United States Patent and Trademark Office*